United States Patent Office 3,514,448
Patented May 26, 1970

3,514,448
17-OXYGENATED 2-HALO-4-(METHYL/METH-YLENE) - 5α - ANDROST - 1 - EN-3-ONES AND PRECURSORS
Ivar Laos, Skokie, Ill., assignor to G. D. Searle & Co., Chicago, Ill., a corporation of Delaware
No Drawing. Filed June 28, 1966, Ser. No. 561,001
Int. Cl. C07c 173/00, 169/10, 169/06
U.S. Cl. 260—239.55
9 Claims

ABSTRACT OF THE DISCLOSURE

Preparation of the captioned compounds—for example, 17β - acetoxy - 2 - chloro-4-methylene-5α-androst-1-en-3-one—and their valuable pharmacological properties—including pepsin-inhibiting, anabolic, androgenic, anti-inflammatory, and anti-biotic activities—are disclosed.

---

This invention relates to 17-oxygenated 2-halo-4-(methyl/methylene)-5α-androst-1-en-3-ones and precursors, and to processes for the preparation thereof. More particularly, this invention provides new, useful, and unobvious chemical compounds of the formula

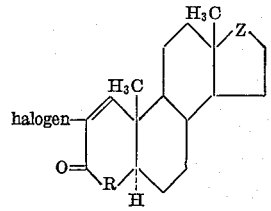

wherein the halogen called for is preferably, but not necessarily exclusively, chlorine or bromine, R represents an ethylidene or vinylidene radical, and Z represents a carbonyl radical or a radical of the formula

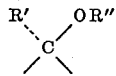

in which R' represents hydrogen or a lower alkyl or ethynyl radical and R" represents hydrogen or an alkanoyl radical.

It follows that when R represents ethylidene, the contemplated compounds are 4-methyl steroids, the methyl group being in the alpha configuration. When R represents vinylidene, the compounds are 4-methylene steroids. The latter compounds are particularly preferred embodiments of the invention.

Among the alkanoyl radicals represented by R", lower alkanoyl radicals are especially advantageous, to wit, radicals of the formula lower alkyl—CO—O—

Those skilled in the art will recognize that lower alkyl radicals are monovalent, saturated, acyclic, straight- or branched-chain, hydrocarbon groupings of empirical formula —$C_nH_{2n+1}$ wherein $n$ represents a positive integer less than 8. Typical lower alkyl radicals include methyl, ethyl, propyl, isopropyl, butyl, isobutyl, sec-butyl, tert-butyl, pentyl, neopentyl, hexyl, isohexyl, heptyl, and the like.

Likewise within the ambit of the present invention are the precursors whence the foregoing compounds are derived. These precursors are 1α,2α-epoxy steroids of the formula

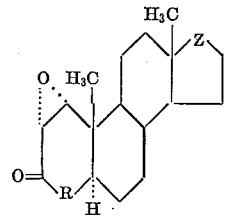

wherein R and Z are defined as before excepting that the 4-methyl substituent called for when R represents ethylidene is sometimes in alpha and sometimes in beta configuration.

The compounds to which this invention relates are useful by reason of their valuable pharmacological properties. Thus, for example, they inhibit the proteolysis of hemoglobin by pepsin, are anabolic and androgenic agents, and counteract the inflammatory response to tissue insult. Moreover, they are antibiotic in respect of *Tetrahymena gelleii*, *Chlorella vulgaris*, and Dicotyledoneae.

Preparation of the subject compounds proceeds by heating an appropriate 1α,2α-epoxy steroid of the formula

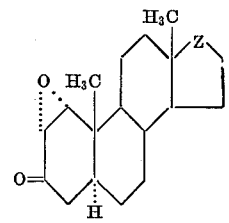

wherein Z retains the meaning previously assigned, with aqueous formaldehyde and sodium acetate in a methanolic medium to give the corresponding 4-methylene compound, which is reducible to a mixture of the 4-methyl epimers by hydrogenation at atmospheic pressure in methanol or dioxane, using palladium-on-charcoal as a catalyst. The precursors which result are converted to 2-halo compounds by contacting with hydrohalic acid in acetic acid solution at approximately room temperature. In the course of this conversion, the 4β-methyl constituent, if any, rearranges to the more stable alpha configuration. Esters are alternatively obtained from corresponding alcohols by prolonged contact with pyridine and an appropriate alkanoic acid anhydride at room temperature.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 1α,2α-epoxy-17β - hydroxy-4-methylene - 5α-androstan-3-one.—To a solution of 95 parts of 1α,2α-epoxy- 17β-hydroxy-5α-androstan-3-one in 1520 parts of methanol is added 513 parts of aqueous 36% formaldehyde, followed by a solution of 71 parts of sodium acetate in 285 parts of water. The resultant mixture is stirred at the boiling point for 5 hours, then cooled and thereupon neutralized with glacial acetic acid. Solvent is distilled in vacuo until the distilland becomes cloudy, at which point it is mixed with 8000 parts of ice water. The solid which precipitates is isolated by filtration and taken up in ether. The ether solution is washed with water, dried over anhydrous sodium sulfate, and stripped of solvent by distillation. The residue is 1α,2α-epoxy-17β-hydroxy-4-methylene-5α-androstan-3-one.

(B) 2-chloro - 17β - hydroxy-4-methylene-5α-androst-1-en-3-one.—To a solution of 22 parts of 1α,2α-epoxy-17β-hydroxy-4-methylene-5α-androstan-3-one in 500 parts of acetic acid at 15–20° is slowly added 60 parts of concentrated hydrochloric acid. The resultant mixture is maintained with agitation at room temperatures for 1 hour, then mixed with 5000 parts of ice water. The solid precipitate thrown down is filtered off, washed with water, dried in air, and chromatographed on silica gel, using benzene and ethyl acetate as developing solvents. From an eluate comprising 5% ethyl acetate in benzene, on evaporation of solvent and recrystallization of the residue from a mixture of acetone and hexane, 2-chloro-17β-hydroxy-4-methylene-5α-androst-1-en-3-one is obtained. The product has the formula

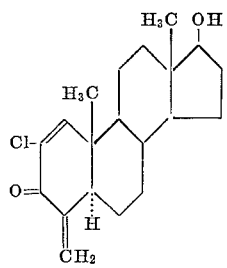

EXAMPLE 2

(A) 17β-acetoxy - 1α,2α - epoxy-4-methylene-5α - androstan-3-one.—A solution of 95 parts of 1α,2α-epoxy-17β-hydroxy-4-methylene-5α-androstan-3-one in 600 parts of pyridine and 400 parts of acetic anhydride is allowed to stand at room temperatures overnight, then mixed with 10,000 parts of ice water. The precipitate thrown down is filtered off, washed with water, and taken up in ether. The ether solution is washed with water, dried over anhydrous sodium sulfate, and stripped of solvent by distillation. The residue is chromatographed on silica gel, using benzene and ethyl acetate as developing solvents. From an eluate comprising 5% ethyl acetate in benzene, on evaporation of solvent and recrystallization of the residue from a mixture of acetone and hexane, 17β-acetoxy-1α,2α-epoxy - 4 - methylene-5α-androstan-3-one melting at approximately 125.5–126.5° is obtained.

(B) 17α-acetoxy - 2 - chloro-4-methylene-5α-androst-1-en-3-one.—To a solution of 25 parts of 17β-acetoxy-1α,2α-epoxy-4-methylene-5α-androstan-3-one in 500 parts of acetic acid at 15–20° is added, during approximately 5 minutes, 60 parts of concentrated hydrochloric acid. The resultant mixture is stirred for 1 hour at room temperatures, then mixed with 5000 parts of ice water. The solid precipitate thrown down is filtered off, washed with water, dried in air, and chromatographed on silica gel, using benzene and ethyl acetate as developing solvents. From an eluate comprising 1% ethyl acetate in benzene, on evaporation of solvent and recrystallization of the residue from a mixture of acetone and hexane, 17β-acetoxy-2-chloro-4-methylene-5α-androst-1-en-3-one melting at 133–134.5° is obtained. The product has the formula

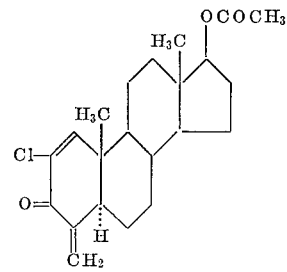

EXAMPLE 3

(A) 17β - acetoxy - 1α,2α - epoxy - 4ξ - methyl - 5α-androstan-3-one.—Approximately 27 parts of 17β-acetoxy - 1α,2α - epoxy - 4 - methylene - 5α - androstan - 3 - one dissolved in 2160 parts of methanol is hydrogenated at room temperatures and atmospheric pressure, using 3 parts of 5% palladium-on-charcoal as catalyst. When the theoretical uptake of hydrogen is achieved, catalyst is filtered off and the filtrate freed of solvent by vacuum distillation. The residue, recrystallized from a mixture of acetone and hexane, affords 17β-acetoxy-1α,2α-epoxy-4ξ-methyl-5α-androstan-3-one melting at 174–177°, a mixture of the 4-epimers.

(B) 17β - acetoxy - 2 - chloro - 4α - methyl - 5α - androst-1-en-3-one.—To a solution of 37 parts of 17β-acetoxy - 1α,2α - epoxy - 4ξ - methyl - 5α -androstan - 3 - one in 700 parts of acetic acid at 15–20° is added, with stirring, 84 parts of concentrated hydrochloric acid. The resultant mixture is allowed to warm to room temperature and maintained thereat for 5 hours with continuous stirring, whereupon the mixture is stirred into 7000 parts of ice water. The solid precipitate which forms is removed by filtration, washed on the filter, dried in air, and chromatographed on silica gel, using benzene and ethyl acetate as developing solvents. From an eluate comprising 1% ethyl acetate in benzene, on evaporation of solvent and recrystallization of the residue from a mixture of acetone and hexane, 17β-acetoxy-2-chloro-4α-methyl-5α-androst-1-en-3-one is obtained. The product melts at approximately 177–178° and has the formula

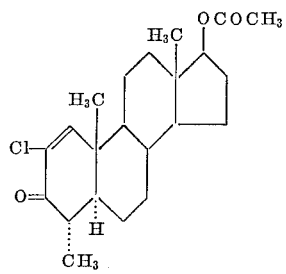

EXAMPLE 4

(A) 1α,2α - epoxy - 4 - methylene - 5α - androstane-3,17-dione.—Substitution of 95 parts of 1α,2α-epoxy-5α-androstane-3,17-dione for the 1α,2α-epoxy-17β-hydroxy-5α-androstan-3-one called for in Example 1(A) affords, by the procedure there detailed, 1α,2α-epoxy-4-methylene-5α-androstane-3,17-dione.

(B) 2 - chloro - 4 - methylene - 5α - androst - 1 - ene-3,17-dione.—Substitution of 22 parts of 1α,2α-epoxy-4-methylene-5α-androstane-3,17-dione for the 1α,2α-epoxy-17β-hydroxy-4-methylene-5α-androstan-3-one called for in Example 1(B) affords, by the procedure there detailed, 2-chloro-4-methylene-5α-androst-1-ene-3,17-dione, having the formula

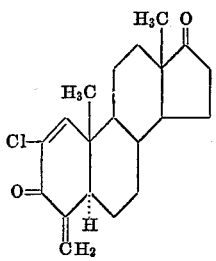

EXAMPLE 5

(A) 1α,2α - epoxy -17β - hydroxy - 17α - methyl - 4-methylene-5α-androstan-3-one.—To a solution of 49 parts of 1α,2α-epoxy-17β-hydroxy-17α-methyl-5α-androstan-3-one in 785 parts of methanol is consecutively added 265 parts of aqueous 36% formaldehyde and a solution of 37 parts of sodium acetate in 147 parts of water. The resultant mixture is heated at the boiling point with agitation under reflux for 5 hours, then cooled, thereupon neutralized with acetic acid, and mixed into 10,000 parts of ice water. The solid product thrown down is filtered off, washed with water, dried in air, and recrystallized from methanol to give 1α,2α-epoxy-17β-hydroxy-17α-methyl-4-methylene-5α-androstan-3-one melting at 194–196°.

(B) 2 - chloro - 17β - hydroxy - 17α - methyl - 4 - methylene-5α-androst-1-en-3-one.—Approximately 60 parts of concentrated hydrochloric acid is stirred into a solution of 25 parts of 1α,2α-epoxy-17β-hydroxy-17α-methyl-4-methylene-5α-androstan-3-one in 500 parts of glacial acetic acid at 17°±5° during 10 minutes. Stirring is continued while the resultant mixture is allowed to warm to room temperature and remain thereat for 1 hour. The mixture thus obtained is poured into 5000 parts of ice water. The precipitate thrown down is filtered off, washed with water, and chromatographed on silica gel, using benzene and ethyl acetate as developing solvents. From an eluate comprising 5% ethyl acetate in benzene, on evaporation of solvent and recrystallization of the residue from a mixture of acetone and hexane, 2-chloro-17β-hydroxy-17α-methyl-4-methylene-5α-androst-1-en-3-one melting at 163–166° is obtained. The product has the formula

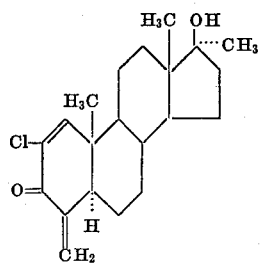

EXAMPLE 6

2-bromo-17β-hydroxy-17α-methyl - 4-methylene-5α-androst-1-en-3-one.—To a solution of 22 parts of 1α,2α-epoxy-17β-hydroxy-17α-methyl - 4 - methylene-5α-androstan-3-one in 440 parts of acetic acid at 18–20° is added, during 10 minutes with continuous stirring, 66 parts of aqueous 48% hydrobromic acid. The mixture is then allowed to warm to room temperature and maintained thereat for 1 hour with continued stirring. The mixture thus obtained is stirred into 5000 parts of ice water. The white solid which precipitates is filtered off, washed on the filter with water, dried in air, and chromatographed on silica gel, using benzene and ethyl acetate as developing solvents. From an eluate comprising 5% ethyl acetate in benzene, on evaporation of solvent and recrystallization of the residue from the mixture of acetone and hexane, 2-bromo-17β-hydroxy-17α-methyl - 4 - methylene-5α-androst-1-en-3-one is obtained. The product melts at 154–156° and decomposes at 157°. It has the formula

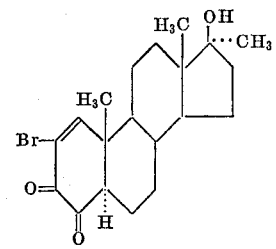

EXAMPLE 7

1α,2α-epoxy - 17β - hydroxy-4ξ,17α-dimethyl-5α-androstan-3-one.—A solution of 5 parts of 1α,2α-epoxy-17β-hydroxy-17α-methyl-4-methylene-5α-androstan-3-one in 500 parts of dioxan is hydrogenated at atmospheric pressure and room temperatures, using 1 part of 5% palladium-on-charcoal as catalyst. When the theoretical amount of hydrogen has been absorbed, catalyst is removed by filtration and the bulk of the solvent is distilled in vacuo and replaced by water. The crystalline precipitate which forms is filtered off, dried in air, and recrystallized from methanol to give 1α,2α-epoxy-17β-hydroxy-4ξ,17α-dimethyl-5α-androstan-3-one melting at 192–195°, a mixture of 4-epimers. The product has the formula

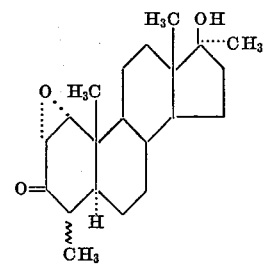

EXAMPLE 8

(A) 1α,2α - epoxy-17α-ethynyl-17β-hydroxy-4-methylene-5α-androstan-3-one.—Substitution of 99 parts of 1α,2α-epoxy - 17α - ethynyl-17β-hydroxy-5α-androstan-3-one for the 1α,2α-epoxy-17β-hydroxy-5α-androstan-3-one called for in Example 1(A) affords, by the procedure there detailed, 1α,2α-epoxy-17α-ethynyl-17β-hydroxy-4-methylene-5α-androstan-3-one.

(B) 2-chloro-17α-ethynyl-17β-hydroxy-4-methylene-5α-androst-1-en-3-one.—Substitution of 27 parts of 1α,2α-epoxy-17α-ethynyl-17β-hydroxy - 4 - methylene-5α-androstan-3-one for the 1α,2α-epoxy-17β-hydroxy-17α-methyl-4-methylene-5α-androstan-3-one called for in Example 5(B) affords, by the procedure there detailed, 2-chloro-17α-ethynyl - 17β-hydroxy-4-methylene-5α-androst-1-en-3-one, having the formula

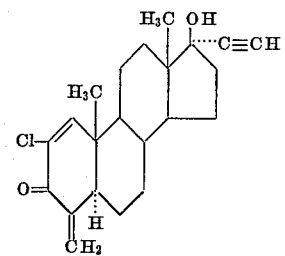

What is claimed is:
1. A compound of the formula

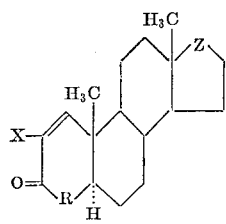

wherein X represents chlorine or bromine, R represents vinylidene, and Z represents carbonyl or a radical of the formula

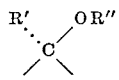

in which R' represents hydrogen, lower alkyl, or ethynyl and R" represents hydrogen or lower alkanoyl.

2. A compound according to claim 1 in which the definitions of X and Z remain unchanged and R represents vinylidene.

3. A compound according to claim 1 which is 17β-acetoxy-2-chloro-4-methylene-5α-androst-1-en-3-one.

4. A compound according to claim 1 which is 2-chloro-4-methylene-5α-androst-1-ene-3,17-dione.

5. A compound according to claim 1 in which the definition of X remains unchanged, R represents vinylidene, and Z represents a radical of the formula

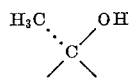

6. A compound according to claim 1 which is 2-bromo-17β-hydroxy - 17α-methyl-4-methylene-5α-androst - 1 - en-3-one.

7. A compound of the formula

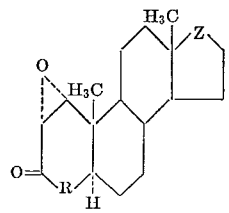

wherein R represents vinylidene and Z represents carbonyl or a radical of the formula

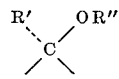

in which R' represents hydrogen, lower alkyl, or ethynyl and R" represents hydrogen or lower alkanoyl.

8. A compound according to claim 7 in which the definition of Z remains unchanged and R represents vinylidene.

9. A compound according to claim 7 which is 17β-acetoxy-1α,2α-epoxy-4-methylene-5α-androstan-3-one.

References Cited
UNITED STATES PATENTS

| 2,851,454 | 9/1958 | Pappo et al. | 260—239.55 |
| 2,980,710 | 4/1961 | Counsell et al. | 260—397.3 |
| 3,252,930 | 5/1966 | Smith et al. | 260—239.55 |

HENRY A. FRENCH, Primary Examiner

U.S. Cl. X.R.

260—397.3, 397.4, 999

PO-1050
(5/69)

UNITED STATES PATENT OFFICE
CERTIFICATE OF CORRECTION

Patent No. 3,514,448                                  Dated October 8, 1970

Inventor(s)    Ivar Laos

It is certified that error appears in the above-identified patent
and that said Letters Patent are hereby corrected as shown below:

Column 6, first formula,

" 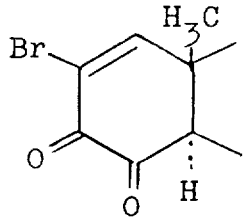 "   should be   -- 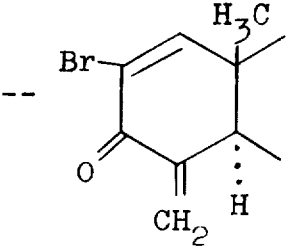 --.

SIGNED AND
SEALED
NOV 24 1970

(SEAL)
Attest:

Edward M. Fletcher, Jr.
Attesting Officer

WILLIAM E. SCHUYLER, JR.
Commissioner of Patents